United States Patent [19]

Eigenmann

[11] 3,874,784
[45] Apr. 1, 1975

[54] SIGNAL REFLECTOR WITH CONVEX REFLECTORS SECURED TO A TRANSPARENT SPHERE

[76] Inventor: Ludwig Eigenmann, Vacallo Ticino, Switzerland

[22] Filed: June 15, 1973

[21] Appl. No.: 370,538

[30] Foreign Application Priority Data
June 17, 1972 Italy ................................. 25845/72
July 1, 1972 Italy ................................. 26499/72

[52] U.S. Cl. ..................... 350/109, 350/105, 264/1, 404/14
[51] Int. Cl. ............................................. G02b 5/12
[58] Field of Search ........................... 350/97–109, 350/293, 294, 288; 264/1; 404/9–16

[56] References Cited
UNITED STATES PATENTS
3,274,888  9/1966  Vanstrum ........................... 350/105
3,496,006  2/1970  Rideout et al. ..................... 350/105
3,556,637  1/1971  Palmquist .......................... 350/105
3,781,083  12/1973  Eigenmann ....................... 350/105

*Primary Examiner*—Ronald L. Wibert
*Assistant Examiner*—Michael J. Tokar
*Attorney, Agent, or Firm*—Michael S. Striker

[57] ABSTRACT

The disclosure describes a method for producing aggregates designed for the manufacture of catoptrically behaving composite reflecting systems and each having a transparent sphere provided with a transparent layer thereabout and a plurality of convex reflective surfaces closely formed into said transparent layer. The method comprises forming said transparent layer with a composition such to provide a non-sticky and non-permanently bead receptive layer, impinging beads on said layer until closely spaced concavities are formed in said layer, applying metered amounts of fluidized transparent material in said concavities for making shallower cavities in same locations, and providing a reflective surface on said shallower cavities. The thus formed aggregates are also described.

4 Claims, 7 Drawing Figures

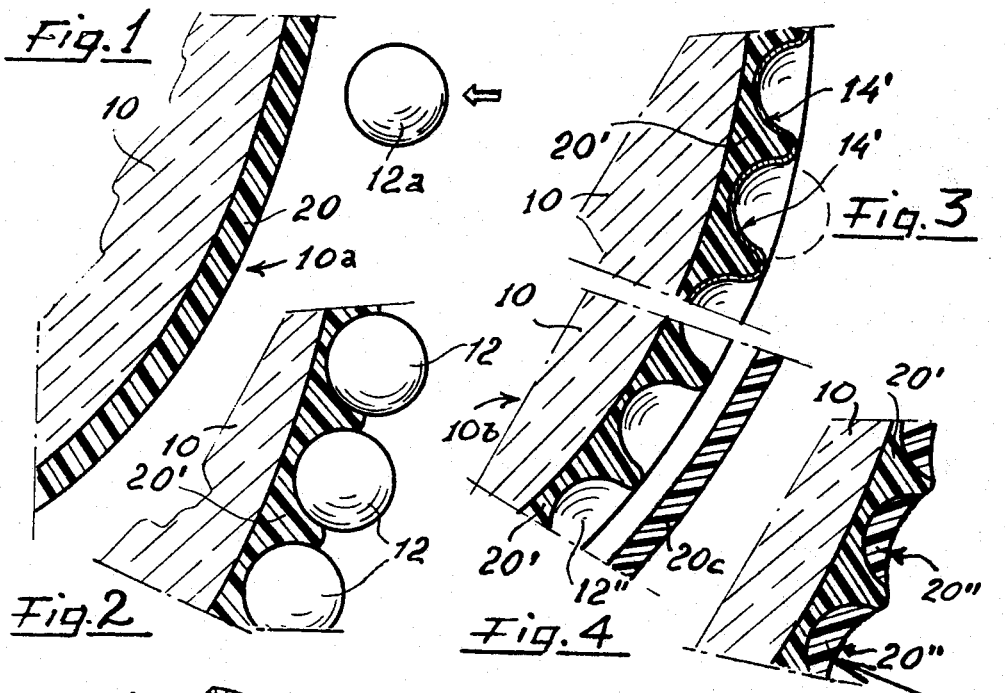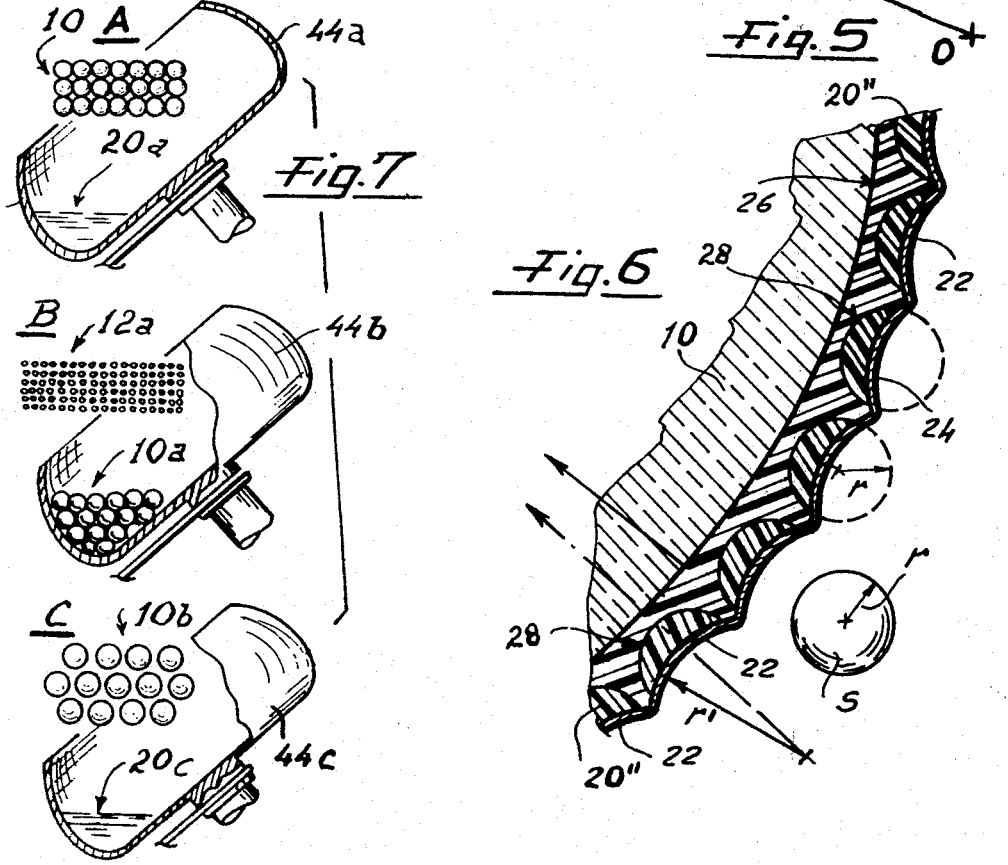

SIGNAL REFLECTOR WITH CONVEX REFLECTORS SECURED TO A TRANSPARENT SPHERE

BACKGROUND OF THE INVENTION a. The Field of the Invention

This invention relates to the manufacture of composite reflecting systems useful for providing nighttime visibility to traffic markings, such as traffic lane dividing lines, as well as other markings. More particularly, this invention is concerned with the manufacture of composite reflecting systems each consisting of an aggregate comprising a main transparent body, generally a glass sphere, designed to provide, when in service, an outer spherical portion exposed to impinging light, a transparent intermediate layer coating said body except at its said exposed spherical portion, and a plurality of reflective part-spherical surfaces arranged about the entire transparent coating, said reflective surfaces being arranged to further focus the light beams impinged on and refracted within said main body and to reflect said beams to said transparent coating and body and through said outer portion of the latter along a path essentially coincident with that of its impingement and refraction within said transparent body.

b. The prior art

These composite reflecting systems have been disclosed and extensively described, for example, in the French Pat. No. 2,086,257, made open to public inspection on Dec. 31, 1971. Such Patent Publication describes either aggregates wherein a main transparent sphere has a plurality of smaller transparent beads secured to and partially embedded into the transparent coating layer, and a reflective coating on the outer portions of said beads (see FIGS. 4, 5 and 7 of said French Publication), and aggregates having a plurality of convex reflective surfaces forming spherical bowls opening in a direction away from said main transparent sphere and having a reflective coating adherently applied thereinto (see FIGS. 10 and 11 of same French Pat. No. 2,086,257). The aggregates of the first type behave "dioptrically," while those of the second type behave "catoptrically," as the further focusing by part of the smaller spherical elements is concerned with. The catoptrically behaving aggregates have been proved as more optically efficient that the dioptrical ones.

In view of the most of the commercial use of such aggregates, namely improving the visibility of traffic markings on road surfaces, these aggregates are formed with small and very small components. As described in the French Publication referred to above, the diameter of said main transparent sphere is between 10 mm and 0.25 mm, preferably between 2 mm and 0.4 mm, and the diameter of the convex reflective surfaces in the catoptrically behaving systems, is between 2 mm and 0.005 mm, preferably between 0.2 mm and 0.02 mm, and is from 1:5 to 1:2000 and preferably from 1:10 to 1:100 that of the main sphere, the center of curvature of said convex surfaces being assumed to merge with the foci at which the light ray focuse upon having been refracted into and through the adjacent main sphere.

It is therefore object of this invention to provide a new and advantageous method for the manufacture of reflecting systems or aggregates of high optical efficiency.

More particularly, it is an object of this invention to provide a method by which catoptrically behaving aggregates including each a main transparent body, in particular a glass sphere, having an uniform transparent coating thereabout and a plurality of reflective convex surfaces evenly arranged about and having radii of curvature markedly greater than that resulting from forming them by impingement of closely arranged small beads on a plastically receptive coating performed about the main sphere.

BRIEF SUMMARY OF THE INVENTION

According to the invention, the method comprises the steps of forming, about a main transparent sphere, a layer of a transparent composition which is essentially liquid and essentially not adhesive at a first lower temperature and which promptly sets when heated at a second and higher temperature, of causing a plurality of spherical beads, heated at a temperature higher than said second temperature, to impinge on and partially penetrate into said essentially liquid layer thus promoting an at least partial setting of said composition where contacted by any impinged heated bead while the said layer remains essentially liquid and bead receptive it its not yet impinged areas, of prosecuting said impingement and penetration until said entire or selected portions of the main body had been covered with a monolayer of closely spaced beads, and of causing said transparent layer to completely set while said beads are partially embedded thereinto.

The said beads, which have preferably been preliminarily coated with a suitable release agent, so that a relatively weak mechanical bond is provided between said bead and said coating upon said impingement and partial embedding step, are then removed from said layer whereby a plurality of closely spaced and relatively deep spherical recesses are formed in said layer. The method comprises further the steps of applying metered amounts of a transparent flowable and settable compound into each said recesses until the same are not completely filled and a concave-convex lens is thus formed into said recesses, the outwardly turned face of each lens being concave but has its radius of curvature remarkably greater than that of the parent recess wherein said lens has been formed and set, and the thus formed article is then provided with an outer internally reflective coating to produce an improved catoptrically behaving system of improved efficiency and capable of retro-collimating rays which have been focused into and through the main sphere at locations external of said sphere.

These and other objects, features and advantages of the invention will be made apparent from the following detailed disclosure, when taken in conjunction with the accompanying drawings.

THE VIEWS OF THE DRAWING

FIG. 1 is a greatly enlarged, sectional and fragmentary view of a preliminarily coated main transparent sphere and of a smaller bead directed to impinge thereon;

FIG. 2 fragmentarily illustrates the sphere of FIG. 1, after the impingement and partial embedding of the beads;

FIG. 3 fragmentarily illustrates a catoptrically behaving system produced by further processing the composite article of FIG. 2, after removal of the smaller beads therefrom;

FIG. 4 fragmentarily illustrates how same article is further processed for producing the catoptrical system of improved efficiency;

FIG. 5 similarly illustrates the result of said further step;

FIG. 6 fragmentarily illustrates the improved catoptrically behaving system according the invention; and FIG. 7 (A, B and C) diagrammatically illustrates a mode for performing the steps leading to produce the intermediate articles fragmentarily shown in FIG. 1 and respectively in FIGS. 2 and 5.

DETAILED DESCRIPTION OF THE PREFERRED EMBODIMENT

An uniformly and meteredly thick layer 20 is formed about main sphere 10, wherein impinging beads (such indicated at 12a) can partially penetrate and be temporarily retained. The step including causing beads 12a to impinge on the layer 20 is performed by making use of a number of beads in excess to that necessary to form a compact monolayer of beads 12 about and in the layer 20. Of course, any bead directed to impinge on an already occupied area, where a bead is yet set will be repelled as it cannot find a bead receptive area. This step is continued until essentially any area greater than one bead will be occupied.

It is however critical that the layer is capable of (a) accept and partially embed any impinging bead, and of (b) retain the partially embedded bead even if the latter will be repeatedly impacted by other bead directed to even rather violently impinge on the sphere 10. Further, this layer, where not yet impinged by beads, must desirably be not or very little adhesive or sticking, to prevent coated spheres to stick to each other if contacting to each other. Therefore, the layer 20 of the invention is made of a composition such to impart to said layer the properties of being essentially not sticking and bead receptive when at a first lower temperature, preferably at ambient temperature, such as below 35°C about, and to promptly becoming bead retentive when and locally where impinged by a bead heated at a higher temperature, such as above 180°C, and then to set in the configuration imparted by the beads which have been impinged on and partially penetrated into said layer.

Such composition preferably comprises a mixture of co-reactive resins capable to form a thermo-settable compound upon a heat accelerated reaction, possibly expedited by a suitable promoter or accelerator agent or agents. Such resins may comprise a polyisocyanate and a polyester having free hydroxils, said resins being capable to form urethane bonds. A suitable composition is given in the following

EXAMPLE

Polyisocyanate resin, parts by weight 18

Polyester resin having free hydroxils, parts by weight 10

Accelerator, parts by weight 0.5

A composition capable of promptly set when heated is well within the common knowledge of those skilled in the art and a variety of components are available on trade for providing such or an equivalent composition. For example, the following compounds, manufactured and/or sold by the Company STABILITAL of Milan, Italy, can be made use of: as polyisocyanate resin, the resin SPENLITE P 25/60 Cx; as polyester resin, the resin POLIFTAL 1955; and, as accelerator, the accelerator DV 1666.

Such composition must be of course compounded shortly prior to its application on the spheres 10 to form the layer 20, and to the performance of the beads impinging step to form the monolayer. Such composition has a pot-life, at ambient temperature, of at least 30 minutes while it nearly instantly gelifies and becomes bead retaining when heated above 150°C about. The passage from its not sticking and bead receptive status and its bead retaining status can be advantageously promoted by impinging on the layer 20 beads which have been heated at from 180°C to 250°C about. The terms or expressions "bead receptive" and "bead retentive," as entered in this description and in the appended claims, are to be understood in the following meanings:

bead receptive means that the layer, in any not yet impinged area thereof, is so plastic to allow a bead to partially penetrate in same layer, causing the layer forming composition to flow about the bead until adherently circumscribing a substantial portion, in particular half about, of the bead spherical surface;

bead retentive means that, upon impingement and partial penetration of a bead, the layer will locally become enough set to maintain its bead circumscribing configuration, complemental to the spherical surface of the impinged bead, and to retain said configuration upon removal of the bead which has thus imparted such configuration.

The several steps leading to the manufacture of an operatable catoptric reflective system will be now more detailedly described with reference to FIGS. 1 to 7.

FIG. 1 illustrates an intermediate bead receptive article 10a consisting of a glass sphere 10 having a bead receptive layer 20 applied thereabout. Such layer can be formed for example as shown in FIG. 7-A. Into a rotary mixer 44a a proper amount of freshly formed composition 20a is located, such composition being that of the above Example or a similar one, and a proper amount of uncoated glass spheres 10 is also located into the mixer. These amounts are metered (upon experimentation) so that by mixing all spheres 10 will be uniformly wetted by the composition and a layer 20 of the desired thickness will be formed about any sphere, so that the article 10a will be prepared.

In another mixer 44b (preferably the same wherein the articles 10a have been prepared) an amount of preliminarily heated beads 12a is added (FIG. 7-B) in excess to that necessary to form uninterrupted monolayers of beads all about any coated sphere 10a. The fact that the layer 20 (FIG. 1) is non-sticking, makes the mass of coated spheres 10a freely flowable in the mixer, wherein any coated sphere 10a will be promptly covered with a monolayer of beads, in which the beads are closely adjacent to each other. FIG. 2 fragmentarily illustrates the article, wherein the transparent layer is made temporarily beads retentive. This step is shown in FIG. 7-B.

The mechanical bond of the beads 12 in the bead retentive layer 20' is made rather weak by coating the beads 12a, to the impinged on the coated spheres 10a, with a proper release agent, such as a baked-on silicone resin coating. The thus applied beads 12 (of FIG. 2) can be brushed off or otherwise removed from the layer 20' to provide an article such as shown in the left part of FIG. 4. Such article comprises therefore a set layer 20' having a plurality of closely spaced nearly hemispherically shaped recesses 12" in any location wherefrom a bead has been taken away. The resulting externally recessed article 10b (FIG. 4) can then be conventionally provided with an inwardly reflective coating 14' (FIG. 3) and a catoptrically behaving system is thus produced.

More preferably such externally recessed article 10b is further processed by throughoutly wetting it with a proper amount 20c of essentially liquid transparent composition capable of partially fill the recesses 12" and of setting in such recesses to form into any one an individual concave-convex lens such as indicated at 20" in FIG. 5. This wetting can be performed by mixing into a suitable mixer 44c (FIG. 7-C) compatible amounts of articles 10b and of composition 20c.

The outer face of any lens 20" (that is the face opposite to sphere 10) will remain convex relatively to said sphere but its radius of curvature will be remarkable greater than that of the spherical recess 12" in which the lens has been formed. The center of one of such outer faces is indicated at 0 in FIG. 5. It is evident that spherical recesses of thus large radii of curvature cannot be formed in set layer 20' by simply removing closedly spaced beads therefrom.

The thus formed article, having rather shallow spherical recesses closedly spaced thereabout, can be conventionally provided with an inwardly reflective coating 22 (FIG. 6) and a greatly efficient catoptrically beaving system is thus produced.

As shown in FIGS. 2 and 4, deeply formed recesses such as indicated at 12" can be formed upon impingement and then removal of bead such as 12, the diameter of which is less than or at most equal to the interaxial interval between the thus formed recesses. By the steps above described, therefore, no recess of radius of curvature greater than the half of said interval can be obviously provided.

Now, by the also described further steps of forming lenses such as at 20" in said recesses 12''', a well shallower spherical surface 20" can be formed at any location wherein a deeper recess had been previously made, the spherical surface being adapted to provide a spherical reflective surface of radius r' (FIG. 6) greater than the radius r of the beads 12, that is than half of the inter-axial interval between said recesses.

I claim:
1. As a new article of manufacture, an improved catoptrically behaving retro-reflecting system, which includes a main transparent sphere designed to have an uncoated spherical portion positioned for light impingement, a transparent coating, and closely spaced shallow spherical recesses in said coating, the radii of curvature of said recesses being greater than half of the inter-axial interval between said recesses, and reflective means on the outer surface of said shallow spherical recesses.

2. An improved reflecting system, particularly a catoptrically-behaving retroreflective system or the like, comprising a plurality of light-conductive spherical bodies, each having at least two outer surface portions, one of which is to be positioned to receive impinging light from an external light source; a light-conductive coating having at least two constituent parts, a first constituent part being deposited uniformly about both of said outer surface portions and being formed with part-spherical indentations, and a second constituent part partly filling only those of said indentations which are located on said other surface portion of the respective spherical bodies; and reflective means coating said second constituent part and being reflective inwardly of the respective spherical body so as to reflect light which impinges through said one outer surface portion, and direct it back through said one outer surface portion in a direction substantially towards said external light source.

3. A reflecting system as defined in claim 2, wherein said first constituent part of said light-conductive mixture is flowable and non-adhesive at a first lower temperature and settable at a second higher temperature; and wherein said first constituent part is capable of being impinged on its outer surface area and of retaining the shape of a heated impinging article after impingement has occurred.

4. A reflecting system as defined in claim 3, wherein said second constituent of said light-conductive mixture is flowable at a first lower temperature and settable at a second higher temperature; and wherein said second constituent part forms said indentations of large radii of curvature by partially filling said indentations with said second constituent and allowing said second constituent to set.

* * * * *